(12) United States Patent
Tamama et al.

(10) Patent No.: US 10,776,943 B2
(45) Date of Patent: Sep. 15, 2020

(54) SYSTEM AND METHOD FOR 3D ASSOCIATION OF DETECTED OBJECTS

(71) Applicant: Samsung Electronics Co., Ltd., Suwon-si, Gyeonggi-do (KR)

(72) Inventors: Hideo Tamama, McKinney, TX (US); Seok-Jun Lee, Allen, TX (US); Manish Goel, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 77 days.

(21) Appl. No.: 16/037,899

(22) Filed: Jul. 17, 2018

(65) Prior Publication Data

US 2020/0027236 A1 Jan. 23, 2020

(51) Int. Cl.
| | |
|---|---|
| G06T 7/73 | (2017.01) |
| G06T 7/11 | (2017.01) |
| G06F 3/01 | (2006.01) |
| G06F 3/0346 | (2013.01) |
| G06T 7/50 | (2017.01) |
| G02B 27/01 | (2006.01) |
| G06T 7/00 | (2017.01) |
| G06F 3/0481 | (2013.01) |

(52) U.S. Cl.
CPC ............ *G06T 7/73* (2017.01); *G02B 27/0172* (2013.01); *G06F 3/012* (2013.01); *G06F 3/0346* (2013.01); *G06F 3/04815* (2013.01); *G06T 7/11* (2017.01); *G06T 7/50* (2017.01); *G06T 7/97* (2017.01); *G02B 2027/0138* (2013.01); *G02B 2027/0178* (2013.01); *G06T 2207/10028* (2013.01)

(58) Field of Classification Search
CPC ...................... G06T 19/006; G06T 7/10; G06T 2207/30244; G06T 2207/10028; G06T 2207/10021; G06T 2207/10024

USPC ....... 382/103, 154, 106, 164, 165, 181, 224, 382/282, 283, 284, 285, 291, 293, 294; 463/33, 31; 345/424, 619
See application file for complete search history.

(56) References Cited

U.S. PATENT DOCUMENTS

| | | | |
|---|---|---|---|
| 9,019,266 | B2 | 4/2015 | Hoguet |
| 9,201,499 | B1 | 12/2015 | Chang et al. |

(Continued)

FOREIGN PATENT DOCUMENTS

KR 10-2012-0005735 A 1/2012

OTHER PUBLICATIONS

International Search Report and Written Opinion of the International Searching Authority in connection with International Patent Application No. PCT/KR2019/008843 dated Oct. 21, 2019, 10 pages.

*Primary Examiner* — Congvan Tran

(57) ABSTRACT

An electronic device, method, and computer readable medium for 3D association of detected objects are provided. The electronic device includes at least one image sensor, an inertial measurement sensor, a memory, and at least one processor coupled to the at least one image sensor, the inertial measurement sensor, and the memory. The at least one processor is configured to capture an image of an environment using the at least one image sensor, detect an object in the captured image, define a bounded area in the image around the detected object, receive head pose data from the inertial measurement sensor, and determine a location of the detected object in a 3D space using the head pose data and the bounded area in the captured image.

20 Claims, 9 Drawing Sheets

(56) References Cited

U.S. PATENT DOCUMENTS

| | | | |
|---|---|---|---|
| 9,569,847 B1 | 2/2017 | Strelow et al. | |
| 2012/0306876 A1 | 12/2012 | Shotton et al. | |
| 2013/0187912 A1 | 7/2013 | Mueller | |
| 2014/0002444 A1* | 1/2014 | Bennett | G06F 3/012 |
| | | | 345/419 |
| 2016/0196659 A1 | 7/2016 | Vrcelj et al. | |
| 2017/0228940 A1 | 8/2017 | Kutliroff | |
| 2017/0243352 A1* | 8/2017 | Kutliroff | G06T 7/10 |
| 2018/0005015 A1 | 1/2018 | Hou et al. | |
| 2018/0025500 A1* | 1/2018 | Nielsen | G06T 7/74 |
| | | | 382/103 |
| 2018/0204469 A1* | 7/2018 | Moster | G05D 1/0094 |
| 2018/0241983 A1* | 8/2018 | Kimura | H04N 13/156 |
| 2018/0276841 A1* | 9/2018 | Krishnaswamy | H04N 7/185 |
| 2019/0187876 A1* | 6/2019 | Platt | G06F 3/167 |
| 2019/0213402 A1* | 7/2019 | Yang | G06F 3/012 |

\* cited by examiner

US 10,776,943 B2

SYSTEM AND METHOD FOR 3D ASSOCIATION OF DETECTED OBJECTS

TECHNICAL FIELD

This disclosure relates generally to augmented reality systems and methods. More specifically, this disclosure relates to a system and method for 3D association of detected objects.

BACKGROUND

Object detection in 3D space is an important aspect of augmented reality applications. Augmented reality applications however present challenges with respect to determining the scale and depth of a detected object in 3D space.

SUMMARY

This disclosure provides a system and method for 3D association of detected objects.

In one embodiment, an electronic device provides for 3D association of detected objects. The electronic device includes at least one image sensor, an inertial measurement sensor, a memory, and at least one processor coupled to the at least one image sensor, the inertial measurement sensor, and the memory. The at least one processor is configured to capture an image of an environment using the at least one image sensor, detect an object in the captured image, define a bounded area in the image around the detected object, receive head pose data from the inertial measurement sensor or from another processor configured to compute head poses using the inertial measurement sensor and image sensor data, and determine a location of the detected object in a 3D space using the head pose data and the bounded area in the captured image.

In another embodiment, a method provides for 3D association of detected objects. The method includes capturing an image of an environment using at least one image sensor, detecting an object in the captured image, defining a bounded area in the image around the detected object, receiving head pose data from an inertial measurement sensor or from another processor configured to compute head poses using the inertial measurement sensor and image sensor data, and determining a location of the detected object in a 3D space using the head pose data and the bounded area in the captured image In yet another embodiment, a non-transitory medium embodying a computer program provides for operating an electronic device for 3D association of detected objects, the electronic device including at least one image sensor, an inertial measurement sensor, a memory, and at least one processor. The program code, when executed by at least one processor, causes the electronic device to capture an image of an environment using at least one image sensor, detect an object in the captured image, define a bounded area in the image around the detected object, receive head pose data from an inertial measurement sensor or from another processor configured to compute head poses using the inertial measurement sensor and image sensor data, and determine a location of the detected object in a 3D space using the head pose data and the bounded area in the captured image Other technical features may be readily apparent to one skilled in the art from the following figures, descriptions, and claims.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
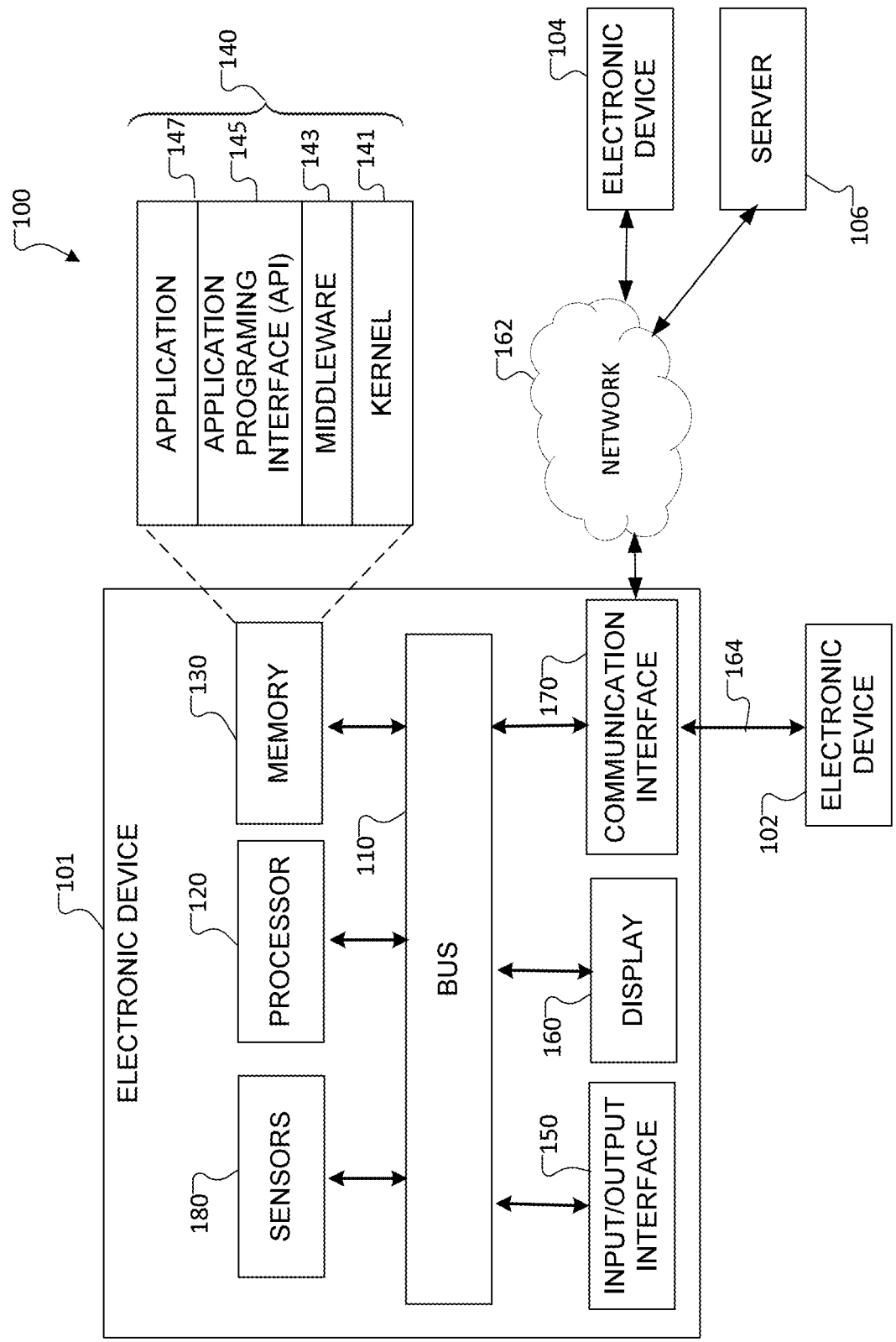
FIG. 1 illustrates an example network configuration according to embodiments of the present disclosure.

FIGS. 1 through 9, discussed below, and the various embodiments of the present disclosure are described with reference to the accompanying drawings. However, it should be appreciated that the present disclosure is not limited to the embodiments and all changes and/or equivalents or replacements thereto also belong to the scope of the present disclosure. The same or similar reference denotations may be used to refer to the same or similar elements throughout the specification and the drawings.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and do not limit the components. These terms are only used to distinguish one component from another. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts.

For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "'an," and "the" include plural references unless the context clearly dictates otherwise. All terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a PDA (personal digital assistant), a portable multimedia player (PMP), an MP3 player, a mobile medical device, a camera, or a wearable device (e.g., smart glasses, a head-mounted device (HMD), electronic clothes, an electronic bracelet, an electronic necklace, an electronic appcessory, an electronic tattoo, a smart mirror, or a smart watch).

Definitions for other certain words and phrases are provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

Object detection in 3D space is an important aspect of augmented reality applications. Augmented reality applications present challenges with respect to determining the scale and depth of a detected object in 3D space. For example, the scale of a detected object is used to determine the nature of the detected object. For instance, if a car is detected in the image, the scale of the car can determine whether the car is a toy or a real car. Although 3D object detection such as by using convolutional neural networks and geometry are possible, such methods can be expensive computationally. Object detection for augmented reality can thus be performed in the 2D domain, which provides for fewer computations, but the object still needs to be associated with 3D space. While 3D space understanding can be determined using depth or stereo cameras, 3D space understanding can also be achieved using Simultaneous Localization and Mapping (SLAM).

FIG. 1 illustrates an example network configuration 100 according to various embodiments of the present disclosure. The embodiment of the network configuration 100 shown in FIG. 1 is for illustration only. Other embodiments of the network configuration 100 could be used without departing from the scope of this disclosure.

According to an embodiment of the present disclosure, an electronic device 101 is included in a network environment 100. The electronic device 101 can include at least one of a bus 110, a processor 120, a memory 130, an input/output (IO) interface 150, a display 160, a communication interface 170, or sensors 180. In some embodiments, the electronic device 101 may exclude at least one of the components or may add another component.

The bus 110 includes a circuit for connecting the components 120 to 170 with one another and transferring communications (e.g., control messages and/or data) between the components.

The processor 120 includes one or more of a central processing unit (CPU), an application processor (AP), or a communication processor (CP). The processor 120 is able to perform control on at least one of the other components of the electronic device 101, and/or perform an operation or data processing relating to communication. In some embodiments, the processor can be a graphics processor unit (GPU).

For example, the processor 120 can receive a plurality of frames captured by a camera during a capture event. The processor 120 can detect objects located within one or more of the captured plurality of frames. The processor 120 can define a bound area around a detected object. The processor 120 can also receive head pose information from an inertial measurement unit. The processor 120 can determine a location of the detected object in a 3D space using the head pose information and the bounded area in a captured frame. The processor 120 can place a virtual object in the 3D space near the determined location of the detected object. The processor 120 can operate the display to display the 3D space including the detected object and the virtual object.

The memory 130 can include a volatile and/or non-volatile memory. For example, the memory 130 can store commands or data related to at least one other component of the electronic device 101. According to an embodiment of the present disclosure, the memory 130 can store software and/or a program 140. The program 140 includes, e.g., a kernel 141, middleware 143, an application programming interface (API) 145, and/or an application program (or "application") 147. At least a portion of the kernel 141, middleware 143, or API 145 may be denoted an operating system (OS).

For example, the kernel 141 can control or manage system resources (e.g., the bus 110, processor 120, or a memory 130) used to perform operations or functions implemented in other programs (e.g., the middleware 143, API 145, or application program 147). The kernel 141 provides an interface that allows the middleware 143, the API 145, or the application 147 to access the individual components of the electronic device 101 to control or manage the system resources. The application 147 includes one or more applications for image capture, object detection, head or camera poses, Simultaneous Localization and Mapping (SLAM) processing, and object classification and tagging. These functions can be performed by a single application, or multiple applications that each carry out one or more of these functions.

The middleware 143 can function as a relay to allow the API 145 or the application 147 to communicate data with the kernel 141, for example. A plurality of applications 147 can be provided. The middleware 143 is able to control work requests received from the applications 147, e.g., by allocating the priority of using the system resources of the electronic device 101 (e.g., the bus 110, the processor 120, or the memory 130) to at least one of the plurality of applications 147.

The API 145 is an interface allowing the application 147 to control functions provided from the kernel 141 or the middleware 143. For example, the API 145 includes at least one interface or function (e.g., a command) for filing control, window control, image processing or text control.

The IO interface 150 serves as an interface that can, e.g., transfer commands or data input from a user or other external devices to other component(s) of the electronic device 101. Further, the IO interface 150 can output commands or data received from other component(s) of the electronic device 101 to the user or the other external device.

The display 160 includes, e.g., a liquid crystal display (LCD), a light emitting diode (LED) display, an organic light emitting diode (OLED) display, or a microelectromechanical systems (MEMS) display, or an electronic paper display. The display 160 can also be a depth-aware display, such as a multi-focal display. The display 160 is able to display, e.g., various contents (e.g., text, images, videos, icons, or symbols) to the user. The display 160 can include a touchscreen and may receive, e.g., a touch, gesture, proximity or hovering input using an electronic pen or a body portion of the user.

The communication interface 170, for example, is able to set up communication between the electronic device 101 and an external electronic device (e.g., a first electronic device 102, a second electronic device 104, or a server 106). For example, the communication interface 170 can be connected with the network 162 or 164 through wireless or wired communication to communicate with the external electronic device. The communication interface 170 can be a wired or wireless transceiver or any other component for transmitting and receiving signals, such as images, head or camera pose data, or other information.

Electronic device 101 further includes one or more sensors 180 that can meter a physical quantity or detect an activation state of the electronic device 101 and convert metered or detected information into an electrical signal. For example, sensor 180 can include one or more buttons for touch input, one or more cameras, a gesture sensor, a gyroscope or gyro sensor, an air pressure sensor, a magnetic sensor or magnetometer, an acceleration sensor or accelerometer, a grip sensor, a proximity sensor, a color sensor (e.g., a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an IR sensor, an ultrasound sensor, an iris sensor, a fingerprint sensor, etc. A sensor 180 can also include an inertial measurement unit, which can include one or more accelerometers, gyroscopes, and other components. The sensor(s) 180 can further include a control circuit for controlling at least one of the sensors included therein. Any of these sensor(s) 180 can be located within the electronic device 101. The one or more cameras can capture images for object detection and 3D environment mapping. The inertial measurement unit can track head poses and/or other movement of the electronic device 101.

The first external electronic device 102 or the second external electronic device 104 can be a wearable device or an electronic device 101—mountable wearable device (e.g., a head mounted display (HMD)). When the electronic device 101 is mounted in the electronic device 102 (e.g., the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses that include one or more cameras for SLAM and object detection for 3D association of detected objects.

The wireless communication is able to use at least one of, e.g., long term evolution (LTE), long term evolution-advanced (LTE-A), 5th generation wireless system (5G), mm-wave or 60 GHz wireless communication, Wireless USB, code division multiple access (CDMA), wideband code division multiple access (WCDMA), universal mobile telecommunication system (UMTS), wireless broadband (Wi-Bro), or global system for mobile communication (GSM), as a cellular communication protocol. The wired connection can include at least one of universal serial bus (USB), high definition multimedia interface (HDMI), recommended standard 232 (RS-232), or plain old telephone service (POTS).

The network 162 includes at least one of communication networks, e.g., a computer network (e.g., local area network (LAN) or wide area network (WAN)), Internet, or a telephone network.

The first and second external electronic devices 102 and 104 and server 106 each can be a device of the same or a different type from the electronic device 101. According to certain embodiments of the present disclosure, the server 106 includes a group of one or more servers. According to certain embodiments of the present disclosure, all or some of operations executed on the electronic device 101 can be executed on another or multiple other electronic devices (e.g., the electronic devices 102 and 104 or server 106). According to certain embodiments of the present disclosure, when the electronic device 101 should perform some function or service automatically or at a request, the electronic device 101, instead of executing the function or service on its own or additionally, can request another device (e.g., electronic devices 102 and 104 or server 106) to perform at least some functions associated therewith. The other electronic device (e.g., electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example.

Although FIG. 1 shows that the electronic device 101 includes the communication interface 170 to communicate with the external electronic device 104 or server 106 via the network 162, the electronic device 101 may be independently operated without a separate communication function, according to an embodiment of the present disclosure.

The server 106 can support to drive the electronic device 101 by performing at least one of operations (or functions) implemented on the electronic device 101. For example, the server 106 can include a processing module or processor that may support the processor 120 implemented in the electronic device 101.

Although FIG. 1 illustrates one example of a communication system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
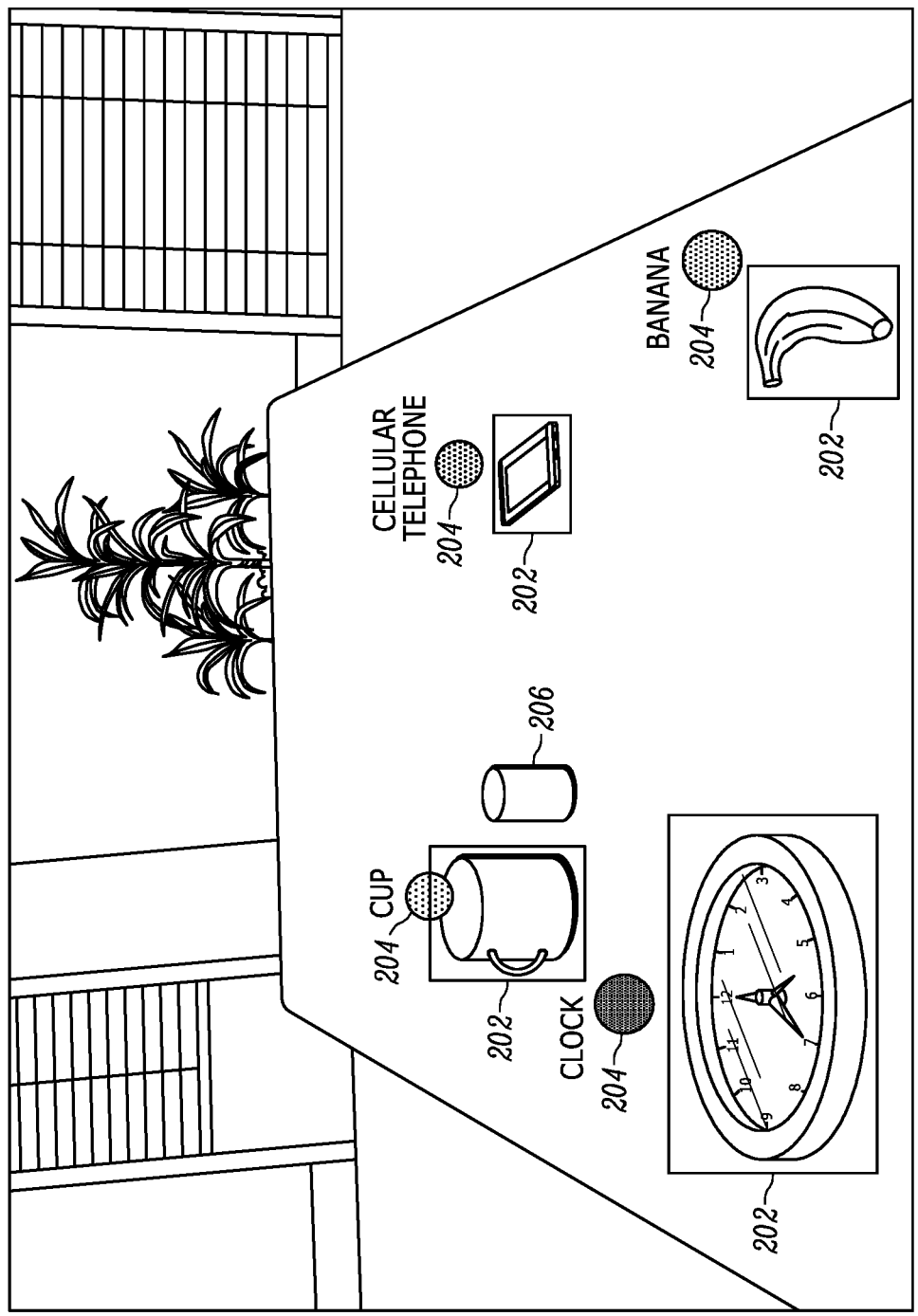
FIG. 2 illustrates an example captured image for use with an augmented reality tagging application according to embodiments of the present disclosure.

FIG. 2 illustrates an example captured image 200 for use with an augmented reality tagging application executed by a processor, such as processor 120 of electronic device 101 according to embodiments of the present disclosure. As shown in the example captured image 200 of FIG. 2, the captured image 200 includes various detectable objects positioned within the frame of the captured image 200. As the processor detects the location of the objects within the captured image 200, bounded areas 202 are created and displayed around each of the detected objects. The processor defines a bounded area 202 by the associated detected object's location or position within the captured image 200. For example, the processor can determine a center (x,y) coordinate of a detected object within the frame, and define a width (w) and height (h) of the bounded area such that the entire detected object is within the bounded area. As the bounded area is a square or rectangular area, and because the detected objects can be of various shapes, there can be portions of the bounded areas 202 that do not include a surface of the detected object, such as including portions of the surrounding environment in the bounded area 202.

The application executed by the processor also classifies detected objects and tags the detected objects with virtual objects. Image recognition can be implemented to classify each object in a predefined object class. For example, and as illustrated in FIG. 2, a cup detected on the table in the captured image 200 is classified in a "cup" class, a detected clock is classified in a "clock" class, a detected banana is classified in a "banana" class, and a detected cellular telephone is classified in a "cellular telephone" class. The processor can then tag each of the detected items with a graphic 204, displaying the graphic 204 near the bounded area 202 surrounding the detected object. For example, as illustrated in FIG. 2, the displayed graphic 204 adjacent each bounded area 202 is a ball with the object class for the detected object textually displayed near the ball. In some embodiments, the displayed graphics can also be colored based on class. For example, the graphics 204 for the detected cup, cellular telephone, clock, and banana in FIG. 2, could be displayed as a red, blue, green, and yellow ball, respectively.

The detected objects can also be tagged with virtual objects that visually resemble the associated object class. For example, as illustrated in FIG. 2, a virtual cup object 206 can be placed near the detected cup. The virtual cup object 206 can be of a different size than the detected cup. For the placement of virtual objects to be appealing to a user, virtual objects are to be scaled and placed well in 3D space with respect to the virtual objects' associated detected objects in the captured image 200. The application thus determines the scale of the detected object (such as determining a real car vs. a toy car,) and renders the virtual object with a correct scale near the detected object. For example, if a clock is detected on the table, such as in FIG. 2, a virtual clock that is similar but of a different size can be placed near the detected clock for comparison. The processor also determines the depth of the detected object so that the virtual object can be placed at the correct depth in the captured image. This can be especially important for depth-aware displays such as multi-focal displays. To accurately display the virtual objects, the 3D space for the environment in which the objects are detected is mapped using SLAM, and the 2D bounded areas 202 are associated with the 3D space, in accordance with various embodiments of the present disclosure.

Figure 3:
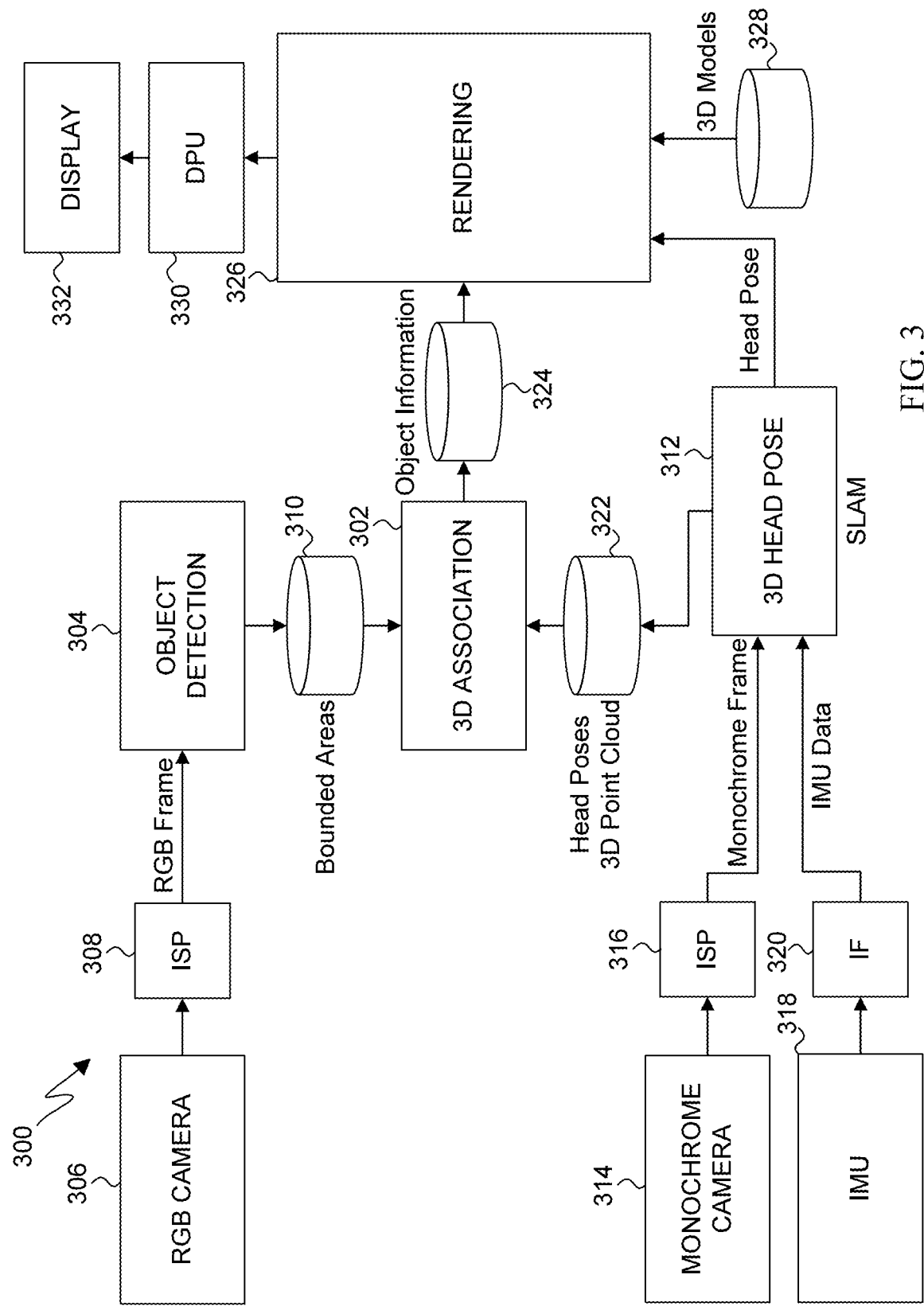
FIG. 3 illustrates an example of an augmented reality object detection and 3D association architecture according to embodiments of the present disclosure.

FIG. 3 illustrates an example of an augmented reality object detection and 3D association architecture 300 according to embodiments of the present disclosure. The architecture 300 includes a 3D association block 302. The 3D association block 302 defines various functions that are executed by a processor, such as processor 120. The processor receives data from two distinct data pipes to perform 3D association of detected objects. One pipe provides object detection information and the other pipe provides 3D head or camera pose and 3D environment information (SLAM data). For the object detection pipe, an object detection block 304 receives data from an RGB camera 306 through an associated image signal processor (ISP) 308. The data received at the object detection block 304 includes RGB frames or images. Each RGB frame or image can include a timestamp.

The connection between the RGB camera 306 and ISP 308 to the object detection block 304 can be an on-the-fly (OTF) connection, such that the connection runs independent and parallel to other OTF connections described with respect to the architecture 300. The object detection block 304 executed by the processor detects objects in RGB images captured by the RGB camera 306. The object detection block 304 defines bounded areas in the RGB images around each detected object and assigns to the detected object and/or the bounded area an object ID, an object class, and a timestamp. The object detection block 304 also defines the position and size of bounded areas around the detected objects in accordance with various embodiments of the present disclosure, such as by determining an (x,y) position of a detected object and determining a size (h,w) for a bounded area around the detected object in the captured image. The detected object and bounded area information, such as object ID, object class, timestamp, position, and size, are stored in a memory 310. The memory 310 can be a temporary memory location or permanent storage location local to a processor executing the object detection block 304 and/or the 3D association block 302, can be a remote storage location such as a server, or other storage location.

For the 3D environment pipe, a 3D head pose block 312 receives data from, for example, a monochrome camera 314 through an associated ISP 316. The data received at the 3D head pose block 312 includes monochrome frames or images, and each frame or image can include a timestamp. The connection between the monochrome camera 314 and the ISP 316 to the 3D head pose block 312 can be an OTF connection, such that the connection runs independent and parallel to other OTF connections described with respect to the architecture 300. The 3D head pose block 312 also receives movement and orientation data, including timestamps, such as timestamps for each head or camera pose, from an inertial measurement unit (IMU) 318 through an interface (IF) 320. The connection between the IMU 318 and the IF 320 to the 3D head pose block 312 can be an OTF connection, such that the connection runs independent and parallel to other OTF connections described with respect to the architecture 300. It will be understood that in some embodiments, a single camera such as the RGB camera 306, can be used for both data pipes. For example, a single camera can capture images used for object detection, and for use in conjunction with IMU data for SLAM processing. In some embodiments, the RGB camera 306 can be a monochrome camera configured to capture images for object detection, or can be another type of image sensing device. In some embodiments, the monochrome camera 314 can be a second RGB camera to provide data to the 3D head pose block 312, or can be another type of image sensing device. In other embodiments, other devices such as laser scanners or sonar devices can be used to provide images, 3D space environmental data for generating the 3D point cloud, and other environmental and SLAM data.

The 3D head pose block 312 executed by the processor generates a 3D point cloud of the environment using images captured by the monochrome camera 314 and movement and orientation data, such as head or camera poses, received from the IMU 318. The data from the 3D head pose block 312, such as head poses, 3D point clouds, images with 2D feature points, or other information can be stored in a memory 322. The memory 322 can be a temporary memory location or permanent storage location local to a processor executing the 3D head pose block 312, the object detection block 304, and/or the 3D association block 302, can be a remote storage location such as a server, or other storage location. The memory 322 can also be the same memory as memory 310, or a separate memory.

The 3D association block 302, executed by the processor, receives the data from the two data pipes and determines locations of detected objects in 3D space. The location of a detected object can be determined by using at least the bounded area associated with the detected object and head pose data received from the data pipes, in accordance with various embodiments described herein. Once the 3D position of the detected object is determined, the 3D position along with other object information such as an object ID and a timestamp is stored in a memory 324. The memory 324 can be a temporary memory location or permanent storage location local to a processor executing the 3D association block 302, the object detection block 304, and/or the 3D head pose block 312, can be a remote storage location such as a server, or other storage location. The memory 324 can also be the same memory as memory 310 or 322, or a separate memory.

The object information stored in the memory 324 is used by a rendering block 326 executed by a processor to attach graphics and virtual objects to the detected objects in the 3D space. The rendering block 326 retrieves object information from the memory 324, 3D models from a memory 328, and head pose data from the 3D head pose block 312. The 3D models can be retrieved according to the class of the detected objects. The rendering block 326 scales the 3D models based on the determined scale of the detected objects and determines a 3D placement, including depth, for each of the 3D models based on the determined 3D position of the detected objects. The memory 328 can be a temporary memory location or permanent storage location local to a processor executing the rendering block 326, the object detection block 304, the 3D head pose block 312, and/or the 3D association block 302, can be a remote storage location such as a server, or other storage location. The memory 328 can also be the same memory as memory 310, 322, or 324, or a separate memory. The 3D association block 302, in some embodiments, can have fast communication/data channels to the object detection pipe and the SLAM pipe, such as by accessing a shared memory between the two pipes. The rendering block 326 provides rendering information to a display processing unit (DPU) or display processor 330 to display images including graphics and virtual objects attached to detected objects on a display 332.

Although FIG. 3 illustrates one example of an augmented reality object detection and 3D association architecture 300, various changes may be made to FIG. 3. For example, the architecture 300 could include any number of each component in any suitable arrangement. It should be understood that the functions performed by the various blocks of the architecture 300 can be performed by a single processor, or distributed among two or more processors, either within the same electronic device or disposed within separate electronic devices. It should also be understood that the RGB camera 306, the monochrome camera 314, and the IMU 318 can be one of the sensors 180 described with respect to FIG. 1. The described functions can be implemented in at least one processor, a graphics processing unit (GPU), or other components. In general, computing architectures come in a wide variety of configurations, and FIG. 3 does not limit the scope of this disclosure to any particular configuration.

Figure 4:
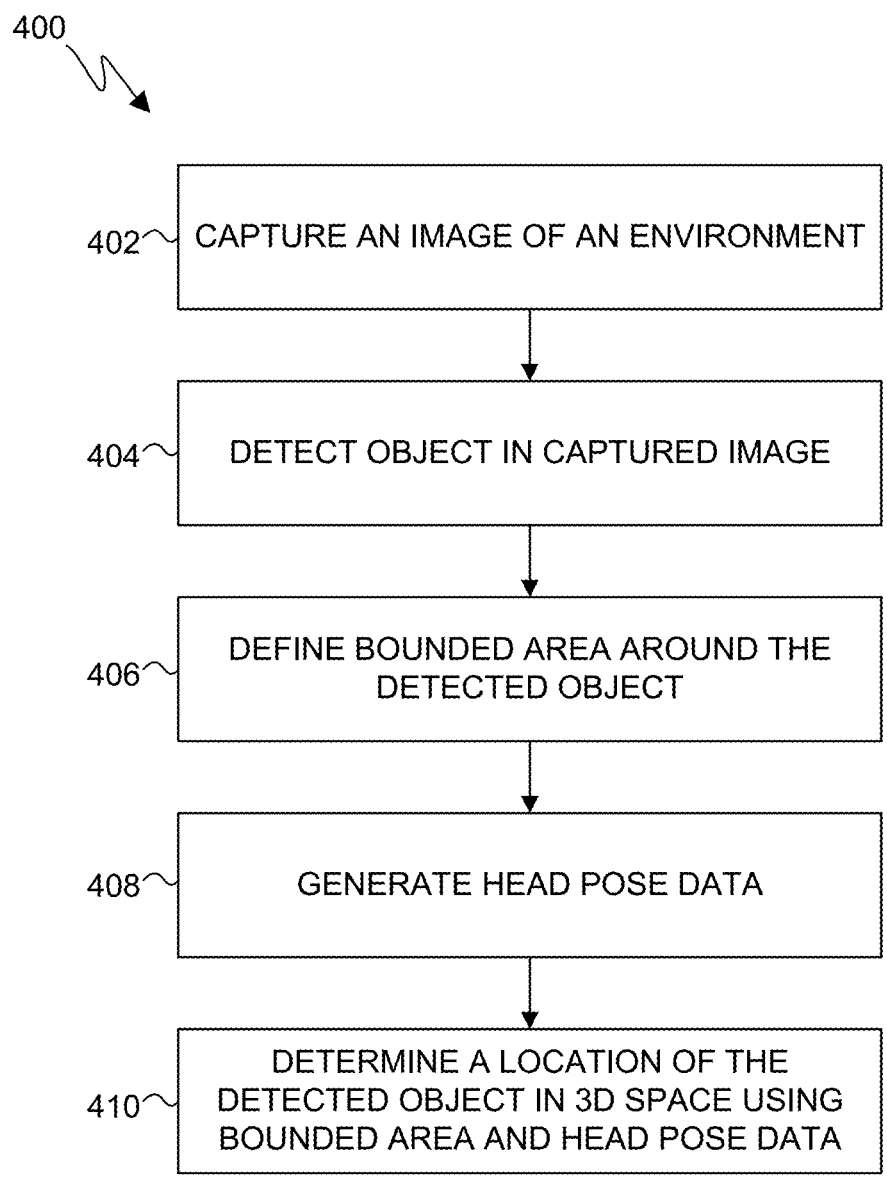
FIG. 4 illustrates a flow diagram of an example object detection and 3D association process according to embodiments of the present disclosure.

FIG. 4 illustrates a flow diagram of an example object detection and 3D association process 400 according to embodiments of the present disclosure. While the flow diagram depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in FIG. 4 can be performed by the electronic device 101 in FIG. 1, and can be executed by the processor 120.

At block 402, the processor controls one or more cameras to capture an image of an environment. At block 404, the processor detects an object in the captured image. At block 406, the processor defines a bounded area around the detected object. The bounded area includes an (x,y) position and a size (w,h) calculated to surround the detected object. At block 408, the processor generates head pose data. The head pose data can be head or camera poses provided by the IMU 318 to the processor, and can include other information such as a 3D point cloud, images with 2D features points, timestamps, or other information. At block 410, the processor determines a location of the detected object in the 3D space associated with the environment using the bounded area and the head pose data, in accordance with various embodiments of the present disclosure.

Although FIG. 4 illustrates an example process, various changes could be made to FIG. 4. For example, while shown as a series of steps, various steps in each figure could overlap, occur in parallel, occur in a different order, or occur multiple times.

Figure 5:
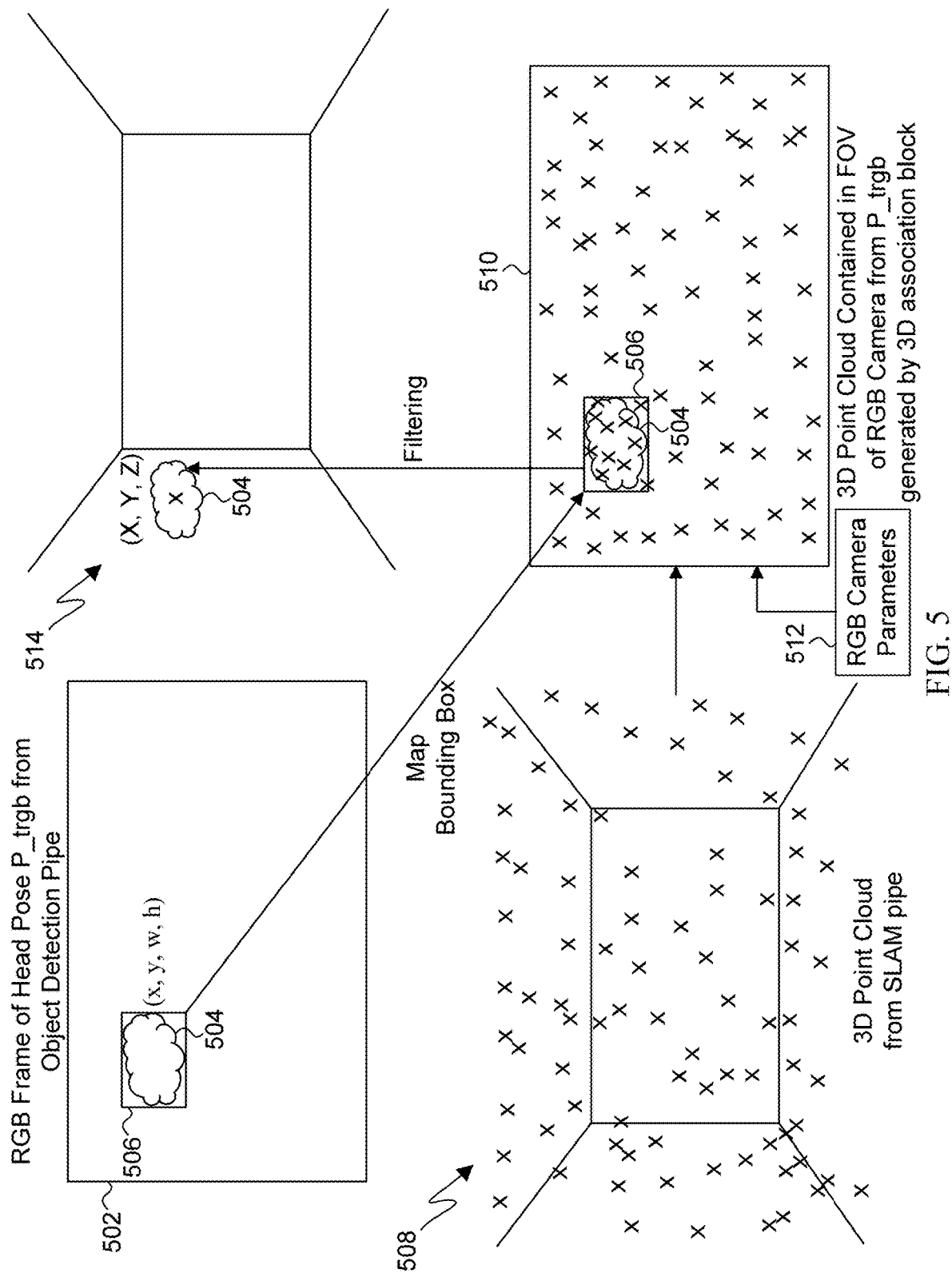
FIG. 5 illustrates a diagrammatic view of a 3D feature point reprojection process for 3D association of detected objects according to embodiments of the present disclosure.

FIG. 5 illustrates a diagrammatic view of a 3D feature point reprojection process for 3D association of detected objects according to embodiments of the present disclosure. The process can be performed by the electronic device 101, and can be executed by the processor 120. The reprojection process includes capturing an RGB frame 502 from a particular head pose (P_trgb) by a sensor such as the RGB camera 306. The processor detects, such as via the object detection block 304, an object 504 within the RGB frame 502 and defines a bounded area 506 around the detected object 504. The bounded area 506 has an (x,y) coordinate within the RGB frame 502, and the processor sizes the bounded area 506 to surround the detected object 504 according to a determined width (w) and height (h). Detected object and bounded area information, such as object ID, object class, timestamp, position, and size, can be stored in a memory to be used during 3D association, such as in the memory 310. Using SLAM, the processor generates a 3D point cloud 508, such as via the 3D head pose block 312, based on one or more parameters such as head pose data received from an IMU, such as IMU 318, and by determining a plurality of 3D feature points of an environment from image data generated, such as from monochrome camera 314. The SLAM data, such as head poses, 3D point clouds, images with 2D feature points, or other information can be stored in a memory to be used during 3D association, such as in the memory 322.

It should be understood that various SLAM algorithms can be used to generate a 3D point cloud of the environment, and this disclosure is not limited to any particular SLAM algorithm. The 3D point cloud 508 can be created using the same camera that captured the RGB frame 502, or a separate camera, in conjunction with movement and orientation data from an IMU, in accordance with embodiments of the present disclosure. The plurality of feature points of the 3D point cloud 508 correspond to detected features in the environment (objects, walls, etc.), and provide a mapping of the features within the environment.

The reprojection process further includes, such as via the 3D association block 302, the processor mapping or reprojecting the 3D point cloud through the captured RGB frame 502 and the bounded area 506, such that the 3D feature points are within the field of view (FOV) 510 of the RGB camera from pose P_trgb. RGB camera parameters 512 for the RGB frame 502 can be used to provide the FOV 510. The processor maps the bounded area 506 including the detected object 504 to the FOV 510. Once the bounded area 506 is mapped within the FOV 510, and the 3D point cloud 508 is reprojected into the FOV 510, the bounded area 506 will include a subset of feature points from the 3D point cloud 508 projected through the bounded area 506, as illustrated in FIG. 5. In some embodiments, the processor can generate and reproject feature points into the bounded area 506 specifically. For example, the processor can use a sparse map instead of a dense map to generate the 3D point cloud 508. A sparse map can reduce the computations used to generate the 3D point cloud 508, but can miss feature points on the detected object 504 in the bounded area 506. If a sparse map is used to generate the 3D point cloud 508, the 3D association block 302, executed by the processor, can request SLAM block 312, which can also be executed by the same processor, to generate 3D feature points within the detected bounded area 506 specifically, and keep the 3D feature points for the bounded area 506 in the 3D point cloud.

Once the 3D feature points are reprojected into the FOV 510, the processor determines which 3D feature points within the bounded area 506 are located on the surface of the detected object 504. The processor removes from the bounded area 506 the 3D feature points that are not located on the surface of the detected object 504. The processor determines the 3D position, including (x,y,z) coordinates, of the detected object 504 in a 3D space 514 from the remaining 3D feature points on the surface of the detected object 504. The 3D position along with other object information such as an object ID and a timestamp is stored in a memory, such as in the memory 324, to be used by the augmented reality tagging application. The processor can use the determined 3D position of the detected object 504 to place the detected object 504 in 3D space 514 at rendering block 326 during operation of the augmented reality tagging application and for display on the display 332.

Figure 6:
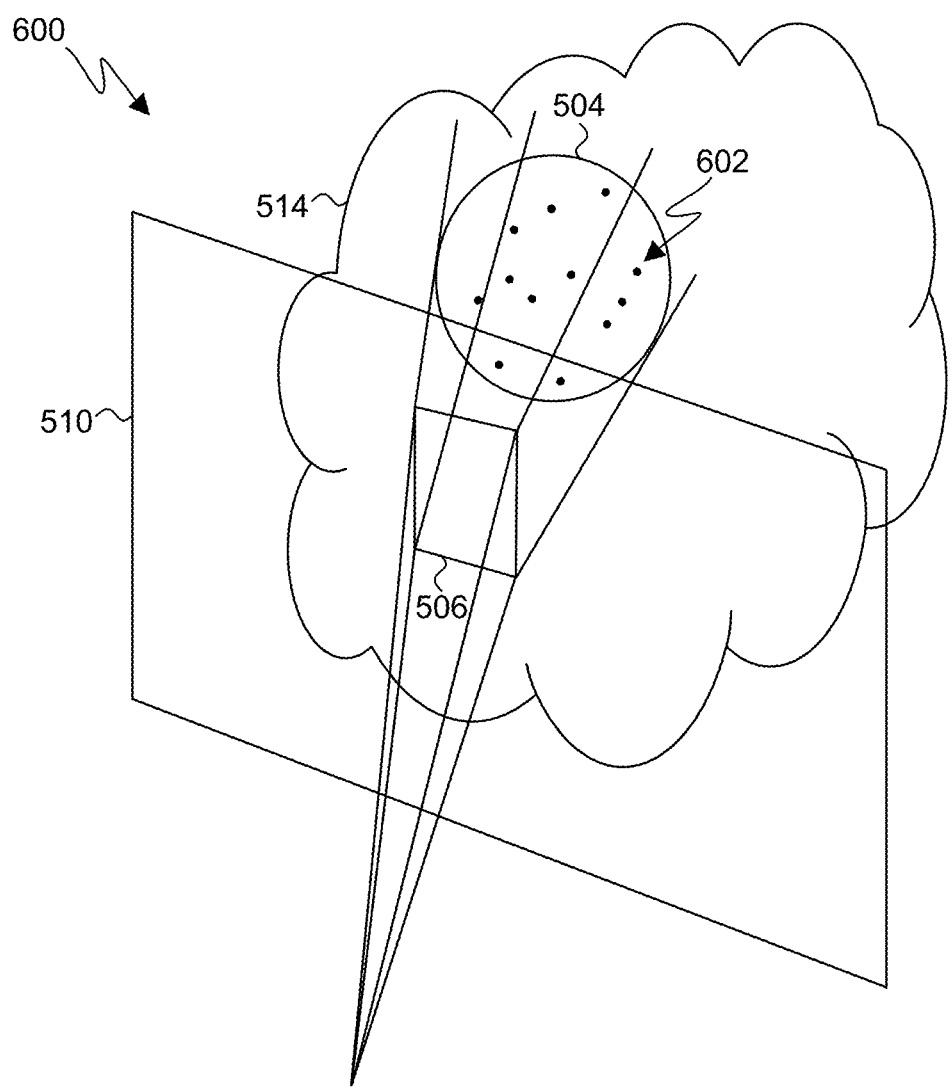
FIG. 6 illustrates a diagram of another illustrative example of the 3D feature point reprojection process according to embodiments of the present disclosure.

FIG. 6 illustrates a diagram 600 of another illustrative example of the 3D feature point reprojection process according to embodiments of the present disclosure. The FOV 510 is illustrated including the bounded area 506. The processor reprojects 3D feature points 602 from the 3D point cloud 508 into the bounded area 506. The processor determines which 3D feature points 602 in the bounded area are not disposed on a surface of the detected object 504, and removes those feature points. The processor can then determine the position of the detected object 504 within the 3D space 514 according to the 3D feature points 602 disposed on one or more surfaces of the detected object 504.

Figure 7:
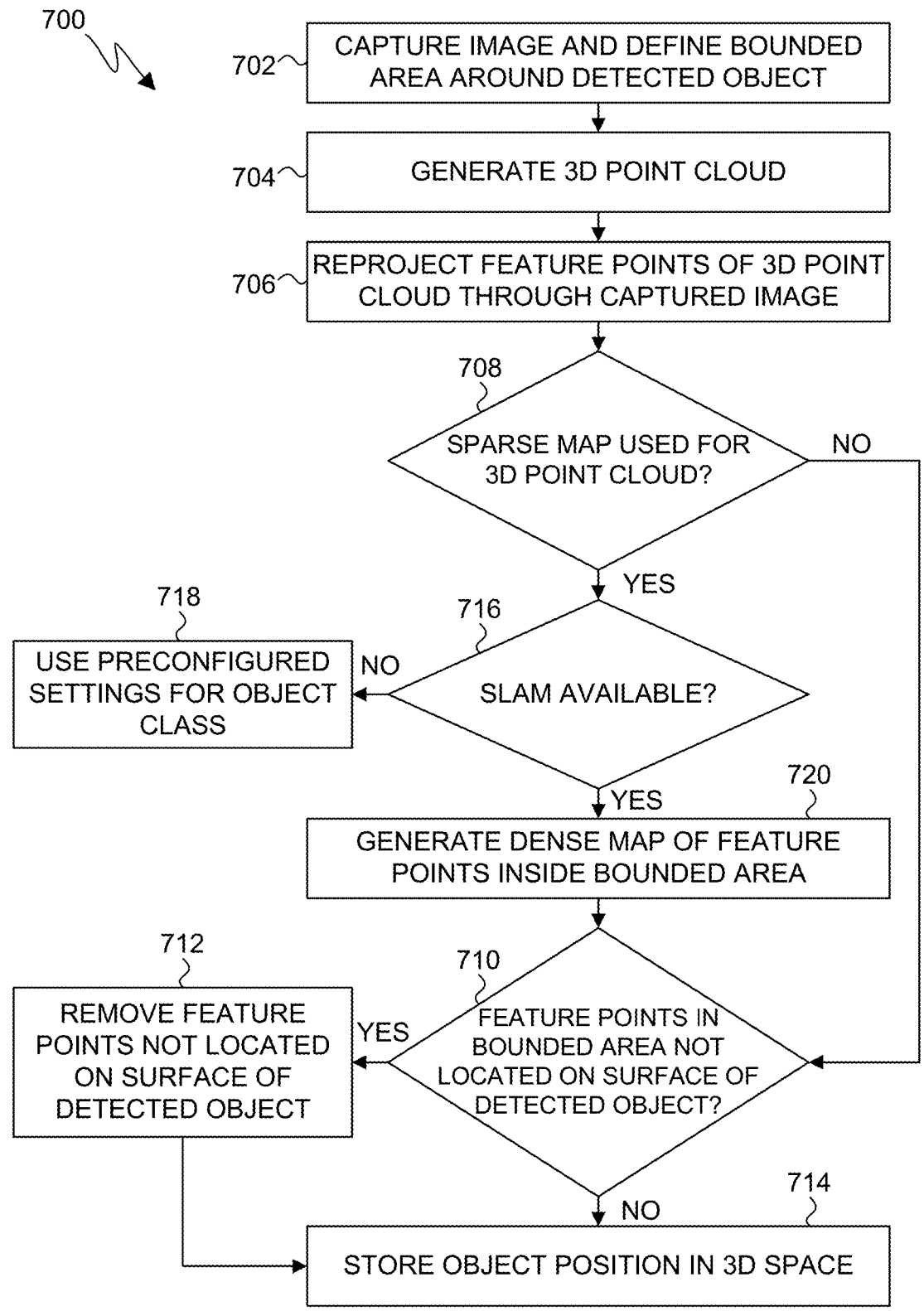
FIG. 7 illustrates a flow diagram of an example 3D feature point reprojection process according to embodiments of the present disclosure.

FIG. 7 illustrates a flow diagram of an example 3D feature point reprojection process 700 according to embodiments of the present disclosure. While the flow diagram depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in FIG. 7 can be performed by the electronic device 101 in FIG. 1, and can be executed by the processor 120.

At block 702, the processor captures an image using one or more cameras and defines a bounded area around a detected object in the image. The process can also associate head pose data with the image that corresponds to the head pose at the time of capture of the image. At block 704, the processor generates a 3D point cloud. The 3D point cloud can be generated from one or more captured images and data received by the processor from an inertial measurement unit, in accordance with embodiments of the present disclosure. At block 706, the processor reprojects 3D feature points of the 3D point through the field-of-view of the image captured in block 702. At decision block 708, the processor determines whether a sparse map was used in generating the 3D point cloud at block 704. If not, the process 700 moves to decision block 710.

At decision block 710, the processor determines if there are feature points projected into the bounded area that are not on a surface of the detected object. If so, the process 700 moves to block 712. At block 712, the processor removes 3D feature points within the bounded area that are not located on a surface of the detected object. The process then moves to block 714. If at decision block 710 the processor determines that there are no feature points in the bounded area that are not located on a surface of the detected object, the process moves from decision block 710 to block 714. At block 714, the processor stores the position of the object in 3D space according to the 3D feature points disposed on the detected object. From block 714, other operations of the electronic device 101 can occur, such as rendering and displaying a virtual object adjacent to the 3D position of the detected object.

If at decision block 708 the processor determines that a sparse map was used in generating the 3D point cloud at block 704, the process moves from decision block 708 to decision block 716. At decision block 716, the processor determines if SLAM is available. In certain situations, such as if there are limited available system resources due to other processes running on the electronic device 101, SLAM can go offline. In some situations, SLAM can be online but is either running too far ahead or behind the object detection pipe. If at decision block 716 the processor determines that the SLAM pipe is not available, the process moves to block 718. At block 718, the processor uses preconfigured settings for the assigned object class of the detected object to place the object in 3D space. For example, the processor can store in a memory a default scale for an object class and use the default scale to determine the distance or depth to place the virtual object in the captured image. The processor can also use a preconfigured distance for the object class. In this case, the processor places the detected object in 3D space according to the detected object's 2D (x,y) coordinates and the preconfigured distance.

If at decision block 716 the processor determines that SLAM is available, the process 700 moves to block 720. At block 720, the processor generates a dense map of 3D feature points inside the bounded area and keeps this dense map for the bounded area in the 3D point cloud. Creating a separate dense map of the bounded area provides that enough feature points are generated on the surface of the object in the bounded area, without using system resources to create a dense map of the entire environment. The process 700 moves from block 720 to block 710 where the processor determines if any feature points from the dense map generated at block 720 are not located on a surface of the detected object, removes such feature points at block 712, and stores the 3D position of the detected object at block 714.

3D features points generated by SLAM provide data regarding the 3D environment, including depth and scale of objects and features of the environment. By reprojecting the 3D feature points onto the surface of the detected object, the 3D location of the detected object in the environment can be determined, including the depth and scale of the detected object. This allows for the nature of the detected object to be determined. For instance, by determining the scale of the detected object, a toy car can be distinguished from an actual car, which can then be properly categorized by the augmented reality tagging application described with respect to FIG. 2. The depth of the object can also be used to provide information to the user such as distance from the user to the object. In addition, the depth and scale of the detected object in the image can be used to accurately attach virtual objects to the detected object in the image such that the application places the virtual object near the detected object in the image and scales the virtual object as defined by the application (the virtual object can intentionally be of a different scale than the detected object) and such that the virtual object remains near the detected object in the image even as the user moves the camera between different poses.

Performing object detection using 2D images while using SLAM for 3D space understanding demands fewer computations and system resources than attempting full 3D object detection, which provides for faster object detection and object tagging. This is important for augmented reality applications in which users utilize a camera to provide a continuous view of a scene or environment, as the user expects the application to display on the user's device accurate and continuously updated information concerning the objects in the environment.

Although FIG. 7 illustrates an example process, various changes could be made to FIG. 7. For example, while shown as a series of steps, various steps in each figure could overlap, occur in parallel, occur in a different order, or occur multiple times.

In some scenarios, system resources of the electronic device 101, or other devices performing one or more of the operations described in the present disclosure, can be limited by other processes being executed by the electronic device 101. In such scenarios, available system resources can prevent SLAM from generating a 3D point cloud. In that case, bounded areas of captured images can be processed by the SLAM pipe to provide 2D feature points on captured frames. If available system resources do not allow for 2D feature points to be generated, the object detection pipe can perform pixel matching between bounded areas of separate captured images to provide feature points via pixel matching. Once feature points are provided, such as either by generating 2D feature points or performing pixel matching, the electronic device 101 can perform triangulation between matching feature points to associate the detected object with a 3D space. The electronic device 101 can thus monitor current available system resources, and can also monitor the quality of the 3D point cloud, and switch 3D association methods (reprojection, 2D feature point triangulation, pixel matching triangulation) in real-time according to the current available system resources.

Figure 8:
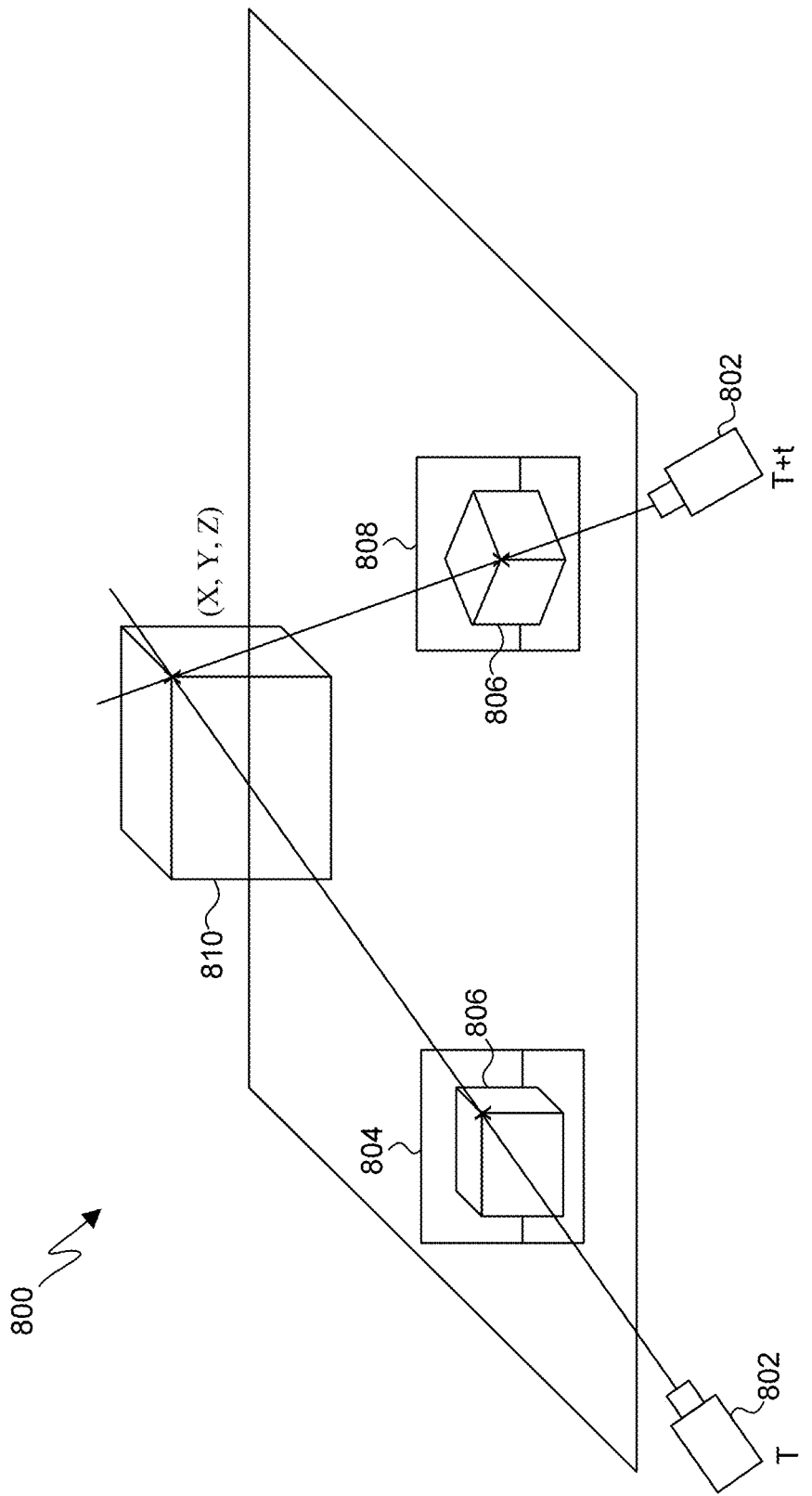
FIG. 8 illustrates a diagram of an example feature point triangulation process according to embodiments of the present disclosure.

FIG. 8 illustrates a diagram 800 of an example feature point triangulation process according to embodiments of the present disclosure. The process can be performed by the electronic device 101, and can be executed by the processor 120. A camera 802 captures a first frame 804 that includes an object 806 in an environment at time T and at a first pose. The camera 802, or another camera, captures a second frame 808 of the object 806 at time T+t and at a second pose. The first frame 804 and the second frame 808, together with pose data of the first and second pose, are processed by the processor to detect the object 806 in each image and generate feature points on the surface of the object 806. The feature points can be 2D feature points if available system resources allow for the SLAM pipe to provide 2D feature points in images. If the SLAM pipe is not providing 2D feature points, and is providing only poses due to available system resources, then the object detection pipe can perform pixel matching between the bounded areas of the first frame 804 and the second frame 808, to determine where the same pixels, and thus the same object features, are located within the first and second frames 804 and 808. For example, the processor can determine that pixels in separate frames that include the same RGB values, and potentially other pixel values, are matched pixels.

The processor triangulates feature points within the first and second frames 804 and 808 using pose information provided by the SLAM pipe. As illustrated in FIG. 8, a feature point at a corner of a cube-shaped object can be triangulated using pose data to determine an orientation of the camera 802 at time T and T+t when the first and second frames 804 and 808 were captured, respectively. The processor triangulates the feature point of the object 806 from each frame 804 and 808 to determine the location of the same feature point within the 3D space. Triangulation can be performed on a plurality of feature points (either 2D feature points or matched pixels) to place a triangulated object 810, including (x,y,z) coordinates, in the 3D space. The processor can triangulate a number of feature points to determine the object's 3D position and scale. For example, the processor can triangulate feature points at each corner of the cube-shaped object illustrated in FIG. 8, which can provide enough information to accurately render the whole shape in 3D space. It will be understood that while FIG. 8 illustrates two poses and two captured frames, more than two poses and frames can be used to provide multiple triangulation points.

Figure 9:
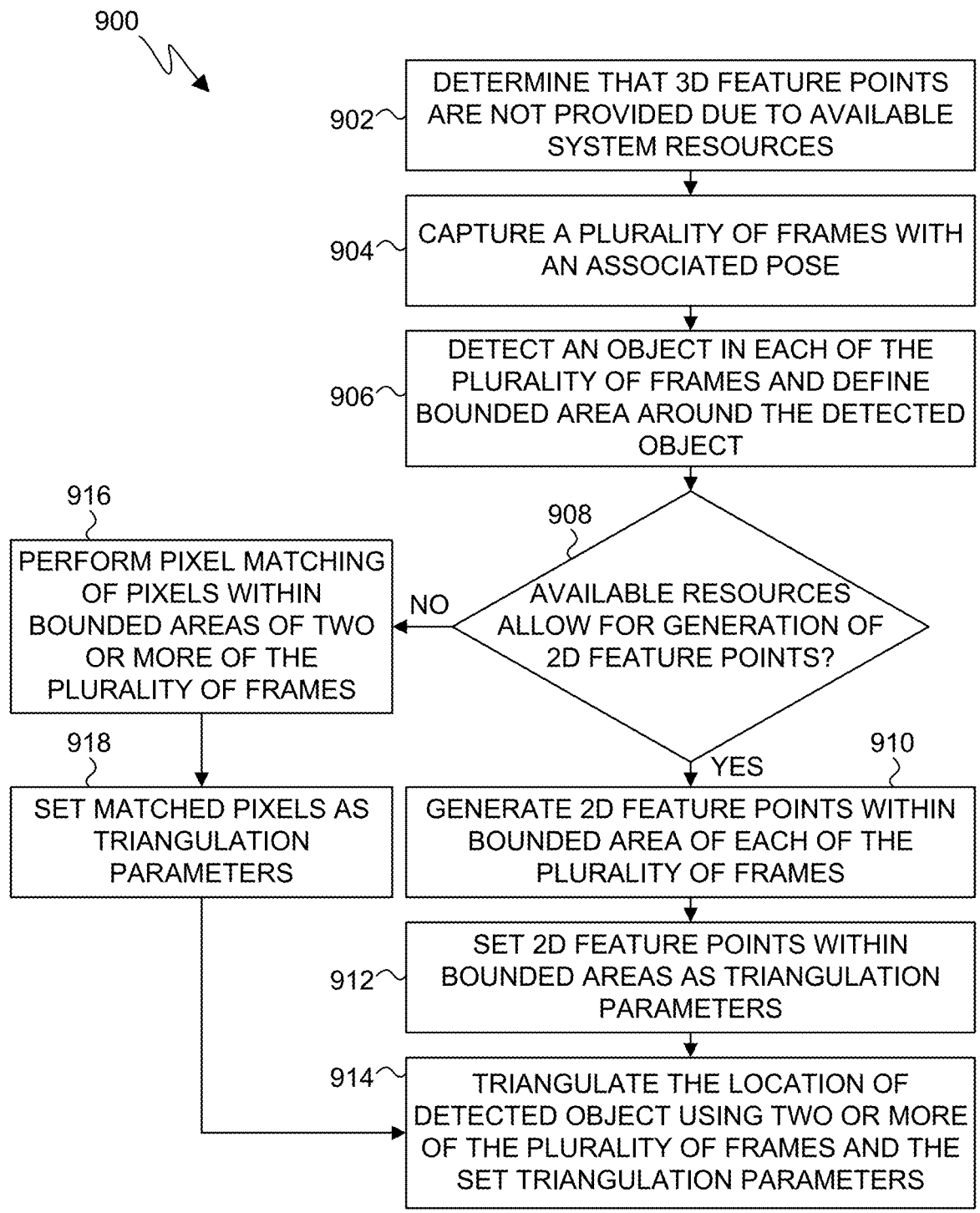
FIG. 9 illustrates a flow diagram of an example detected object triangulation process according to embodiments of the present disclosure.

FIG. 9 illustrates a flow diagram of an example detected object triangulation process 900 according to embodiments of the present disclosure. While the flow diagram depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in FIG. 9 can be performed by the electronic device 101 in FIG. 1, and can be executed by the processor 120.

At block 902, the processor determines that 3D feature points are not provided due to available system resources. At block 904, a plurality of frames, each of which is associated with a pose, is captured by the electronic device. The processor performs object detection on each of the plurality of frames and defines bounded areas around at least one detected object in each of the plurality of frames. At decision block 908, the processor determines if available system resources allow for generation of 2D feature points in the captured images. If so, the process 900 moves to block 910.

At block 910, the processor generates 2D feature points within at least the bounded area of each of the plurality of frames. At block 912, the processor sets one or more of the 2D feature points within the bounded areas as triangulation parameters. At block 914, the processor triangulates the 3D location of the detected object in two or more of the plurality of frames using the set triangulation parameters. In the case wherein the processor set the triangulation parameters as the generated 2D feature points in block 912, the processor triangulates one or more feature points using head pose data for two or more of the images.

If at decision block 908 the processor determines that available system resources do not allow for generation of 2D feature points, the process 900 moves to block 916. At block 916, the processor performs pixel matching between pixels located within bounded areas for a particular object in two or more of the plurality of frames. At block 918, the processor sets one or more of the matched pixels as triangulation parameters, or feature points, to be used in triangulation. The process 900 moves from block 918 to block 914, wherein the processor triangulates the location of the detected object using the set triangulation parameters, which in this case is the matched pixels, to determine the 3D position and scale of the detected object.

Triangulation using 2D features points and pixel matching as described herein provides the depth and scale of the detected object. This allows for the nature of the detected object to be determined. For instance, by determining the scale of the detected object, a toy car can be distinguished from an actual car, which can then be properly categorized by the augmented reality tagging application described with respect to FIG. 2. The depth of the object can also be used to provide information to the user such as distance from the user to the object. In addition, the depth and scale of the detected object in the image can be used to accurately attach virtual objects to the detected object in the image such that the application places the virtual object near the detected object in the image and scales the virtual object as defined by the application (the virtual object can intentionally be of a different scale than the detected object) and such that the virtual object remains near the detected object in the image even as the user moves the camera between different poses.

The triangulation process described herein allows the augmented reality tagging application to continue to operate efficiently even when less system resources are available. This is important for augmented reality applications in which users utilize a camera to provide a continuous view of a scene or environment, as the user expects the application to display on the user's device accurate and continuously updated information concerning the objects in the environment.

Although FIG. 9 illustrates an example process, various changes could be made to FIG. 9. For example, while shown as a series of steps, various steps in each figure could overlap, occur in parallel, occur in a different order, or occur multiple times.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. An electronic device comprising:
at least one image sensor;
an inertial measurement sensor;
a memory; and
at least one processor coupled to the at least one image sensor, the inertial measurement sensor, and the memory, the at least one processor configured to:
capture an image of an environment using the at least one image sensor;
detect an object in the captured image;
define a bounded area in the image around the detected object;
receive head pose data from the inertial measurement sensor;
determine available system resources;
switch, based on the determined available system resources, to a specified three-dimensional (3D) association technique from among a plurality of 3D association techniques; and
determine, according to the specified 3D association technique, a location of the detected object in a 3D space using the head pose data and the bounded area in the captured image.

2. The electronic device of claim 1, wherein, to determine the location of the detected object according to the specified 3D association technique, the at least one processor is further configured to:
generate a 3D point cloud of at least a portion of the environment using the at least one image sensor and the inertial measurement sensor;
project feature points of the 3D point cloud into the captured image, wherein the captured image includes the bounded area;
determine which ones of the feature points are located on a surface of the object; and
remove the feature points that are not located on the surface of the object.

3. The electronic device of claim 2, wherein the at least one processor is further configured to:
determine that a sparse map is used to generate the 3D point cloud;
generate a dense map 3D point cloud of the bounded area; and
project feature points of the dense map 3D point cloud into the bounded area of the captured image.

4. The electronic device of claim 1, wherein, to determine the location of the detected object according to the specified 3D association technique, the at least one processor is further configured to:
capture a plurality of images using the at least one image sensor;
detect the object in each of the plurality of images;
define bounded areas in the plurality of images, wherein each one of the bounded areas is defined around the detected object in one of the plurality of images; and
triangulate, according to the specified 3D association technique, the location of the object in one of the plurality of images with the location of the object in at least another one of the plurality of images.

5. The electronic device of claim 4, wherein, to triangulate the location of the object according to the specified 3D association technique, the at least one processor is further configured to:
generate 2D feature points in each of the plurality of images;
determine the 2D feature points located within each of the bounded areas in the plurality of images; and
perform triangulation of the 2D feature points located within one of the bounded areas of one of the plurality of images with the 2D feature points located within another one of the bounded areas of another one of the plurality of images.

6. The electronic device of claim 4, wherein, to triangulate the location of the object according to the specified 3D association technique, the at least one processor is further configured to:
perform pixel matching between each of the bounded areas of at least two of the plurality of images; and
perform triangulation between matched pixels of the at least two of the plurality of images.

7. The electronic device of claim 1, wherein the at least one processor is further configured to place a virtual object in the 3D space adjacent the detected object, wherein the detected object and the virtual object are associated with an object class.

8. A method for three-dimensional (3D) association of detected objects, the method comprising:
capturing an image of an environment using at least one image sensor;
detecting an object in the captured image;
defining a bounded area in the image around the detected object;
receiving head pose data from an inertial measurement sensor;
determining available system resources;
switching, based on the determined available system resources, to a specified 3D association technique from among a plurality of 3D association techniques; and
determining, according to the specified 3D association technique and using a processor, a location of the detected object in a 3D space using the head pose data and the bounded area in the captured image.

9. The method of claim 8, wherein determining the location of the detected object according to the specified 3D association technique includes:
generating a 3D point cloud of at least a portion of the environment using the at least one image sensor and the inertial measurement sensor;
projecting feature points of the 3D point cloud into the captured image, wherein the captured image includes the bounded area;
determining which ones of the feature points are located on a surface of the object; and
removing the feature points that are not located on the surface of the object.

10. The method of claim 9, wherein determining the location of the detected object according to the specified 3D association technique further includes:
determining that a sparse map is used to generate the 3D point cloud;
generating a dense map 3D point cloud of the bounded area; and
projecting feature points of the dense map 3D point cloud into the bounded area of the captured image.

11. The method of claim 8, wherein determining the location of the detected object according to the specified 3D association technique includes:
capturing a plurality of images using the at least one image sensor;
detecting the object in each of the plurality of images;

defining bounded areas in the plurality of images, wherein each one of the bounded areas is defined around the detected object in one of the plurality of images; and triangulating, according to the specified 3D association technique, the location of the object in one of the plurality of images with the location of the object in at least another one of the plurality of images.

12. The method of claim 11, wherein triangulating the location of the object according to the specified 3D association technique includes:

generating 2D feature points in each of the plurality of images;

determining the 2D feature points located within each of the bounded areas in the plurality of images; and triangulating the 2D feature points located within one of the bounded areas of one of the plurality of images with the 2D feature points located within another one of the bounded areas of another one of the plurality of images.

13. The method of claim 11, wherein triangulating the location of the object according to the specified 3D association technique includes:

matching pixels between each of the bounded areas of at least two of the plurality of images; and triangulating matched pixels of the at least two of the plurality of images.

14. The method of claim 8, further comprising placing a virtual object in the 3D space adjacent the detected object, wherein the detected object and the virtual object are associated with an object class.

15. A non-transitory computer readable medium embodying a computer program for operating an electronic device including at least one image sensor, an inertial measurement sensor, a memory, and at least one processor, the computer program comprising computer readable program code that, when executed by the at least one processor, causes the electronic device to:

capture an image of an environment using the at least one image sensor;

detect an object in the captured image;

define a bounded area in the image around the detected object;

receive head pose data from the inertial measurement sensor;

determine available system resources;

switch, based on the determined available system resources, to a specified three-dimensional (3D) association technique from among a plurality of 3D association techniques; and determine, according to the specified 3D association technique, a location of the detected object in a 3D space using the head pose data and the bounded area in the captured image.

16. The non-transitory computer readable medium of claim 15, wherein the computer program further comprises computer readable program code that, when executed by the at least one processor, causes the electronic device, according to the specified 3D association technique, to:

generate a 3D point cloud of at least a portion of the environment using the at least one image sensor and the inertial measurement sensor;

project feature points of the 3D point cloud into the captured image, wherein the captured image includes the bounded area;

determine which ones of the feature points are located on a surface of the object; and remove the feature points that are not located on the surface of the object.

17. The non-transitory computer readable medium of claim 16, wherein the computer program further comprises computer readable program code that, when executed by the at least one processor, causes the electronic device to:

determine that a sparse map is used to generate the 3D point cloud;

generate a dense map 3D point cloud of the bounded area; and project feature points of the dense map 3D point cloud into the bounded area of the captured image.

18. The non-transitory computer readable medium of claim 15, wherein the computer program further comprises computer readable program code that, when executed by the at least one processor, causes the electronic device, according to the specified 3D association technique, to:

capture a plurality of images using the at least one image sensor;

detect the object in each of the plurality of images;

define bounded areas in the plurality of images, wherein each one of the bounded areas is defined around the detected object in one of the plurality of images; and perform triangulation, according to the specified 3D association technique, on the location of the object in one of the plurality of images with the location of the object in at least another one of the plurality of images.

19. The non-transitory computer readable medium of claim 18, wherein the computer program further comprises computer readable program code that, when executed by the at least one processor, causes the electronic device, according to the specified 3D association technique, to:

generate 2D feature points in each of the plurality of images;

determine the 2D feature points located within each of the bounded areas in the plurality of images; and perform triangulation of the 2D feature points located within one of the bounded areas of one of the plurality of images with the 2D feature points located within another one of the bounded areas of another one of the plurality of images.

20. The non-transitory computer readable medium of claim 18, wherein the computer program further comprises computer readable program code that, when executed by the at least one processor, causes the electronic device, according to the specified 3D association technique, to:

perform pixel matching between each of the bounded areas of at least two of the plurality of images; and perform triangulation between matched pixels of the at least two of the plurality of images.

* * * * *